(No Model.)

W. H. H. NORCROSS.
SURFACE GAGE.

No. 402,763.  Patented May 7, 1889.

enlarged.

Witnesses.  Inventor.
Francis C. Stanwood  Wm. H. H. Norcross.
J. A. Dougherty  by H. E. Lodge Atty.

UNITED STATES PATENT OFFICE.

WILLIAM H. H. NORCROSS, OF BOSTON, MASSACHUSETTS.

SURFACE-GAGE.

SPECIFICATION forming part of Letters Patent No. 402,763, dated May 7, 1889.

Application filed February 23, 1889. Serial No. 300,829. (No model.)

*To all whom it may concern:*

Be it known that I, WILLIAM H. H. NORCROSS, a citizen of the United States, residing at Boston, in the county of Suffolk and State of Massachusetts, have invented certain new and useful Improvements in Surface-Gages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to instruments for testing the accuracy of plane-surfaces—"surface-gages," so called.

My invention relates to improvements in the construction of the gage as an entirety, by which the needle may be moved readily, and thereby quickly adjusted; further, in the particular manner of mounting said needle, which is reversible. Thus the capabilities of the instrument are increased in testing surfaces either in horizontal or vertical planes.

Figure 1:
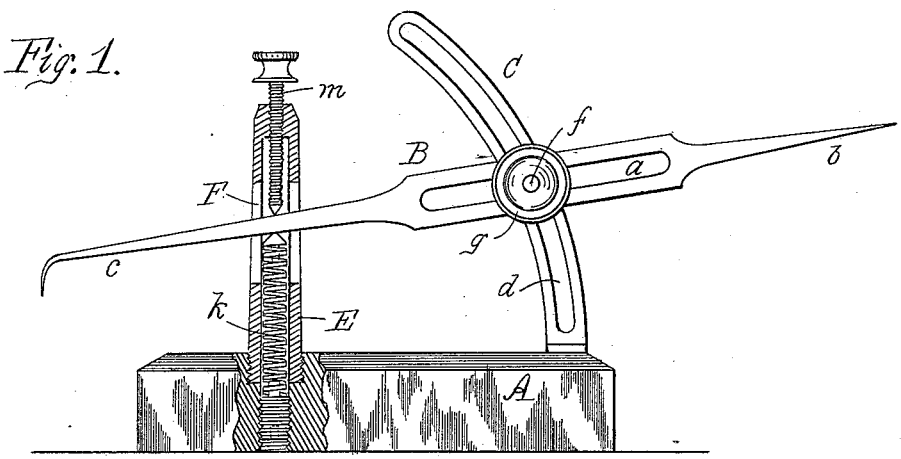
Figure 2:
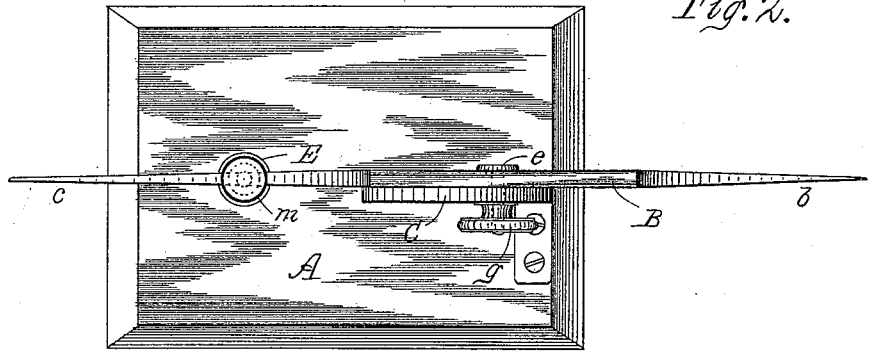
Figure 3:
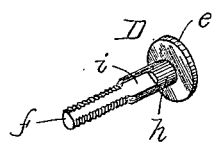

The drawings represent in Figure 1 a vertical sectional elevation of a surface-gage embodying my invention. Fig. 2 is a plan. Fig. 3 is an enlarged perspective view of the clamping-screw.

In said drawings, A represents a solid metallic base of considerable weight, such that the instrument will remain fixed and stationary while the hands of the operator are employed in the adjustment of the needle. The latter (shown at B) consists of a metallic bar, preferably of steel, enlarged in the middle portion, which is longitudinally slotted at $a$. This slot is to give the needle endwise movement to adapt it to advance or retreat to reach different points of the work in process. The two ends $b$ $c$ are differently constructed. The former, $b$, intended to test the accuracy of surfaces lying in vertical planes, is straight. The latter, $c$, is bent at right angles and is adapted to gage surfaces situated in horizontal planes.

The primary object in my invention is to provide both quick and fine adjustment by means of the first to rapidly and approximately adjust the needle to the work in process, and by aid of the fine adjustment to set the needle accurately to any small fraction of a linear unit, as may be desired.

To obtain the quick adjustment, I have secured upon the base a curved standard, C, preferably in the arc of a circle, which is formed with an aperture, $d$, extending its entire length. This standard, may, however, be made straight. Within this aperture or slot is fitted a clamp-bolt, D, which is of peculiar construction and adapted for its situation. Said bolt is composed of the head $e$ and a shank, $f$, screw-threaded to receive the clamping-nut $g$. The part $h$ adjacent to the head is cylindrical to enable the needle to rock thereon easily after the bolt is fixed in position. Moreover, that part $i$, which enters the aperture in the standard, is flattened upon one side. Thus the semi-cylindrical portion just fits the aperture $d$, while the flat face prevents the bolt from turning, and the latter can be moved easily upon the standard within the slot. By this arrangement the needle can be turned easily upon said pivot— the round part of the bolt. Further, the latter is prevented from turning, while the nut can be screwed on or off without any trouble.

Generally in surface-gages the slow adjusting mechanism has been located at or near the axis or center of movement provided for the quick adjustment, and the setting of the needle cannot be so readily made. Hence in the present instance I have provided a second standard or post, E, mounted in the block some distance from the standard C. Said post is hollow and is adapted to receive a coiled spring, $k$, adjustable from below by a screw. At the top and coincident with the center of said post is mounted an adjusting-screw, $m$. Further, I have formed a transverse aperture or slot, F, through which passes the end of the needle opposite that secured upon the standard C. Thus the action of the spring is to actuate the end of the needle which rests thereon, and as the adjusting-screw is advanced or retracted this end of the needle is depressed or raised, while the other end is moved oppositely but to a greater extent. By having the needle supported at two points there are several advantages gained. First, quick adjustment in vertical planes is obtained by means of the slotted standard and its locking-bolt, the needle being free to pivot upon the cylindrical portion of said bolt; secondly, when in the act of moving the needle for the quick adjustment, the inactive end of the needle is free to move endwise through its post E, as well as swing upon its pivots—the extremities of the spring and the adjusting-screw; thirdly, by having the fine adjusting mechanism at some distance from the axis of the quick adjustment a small movement of that end desired to be adjusted is easily and readily effected.

The operation is as follows, the needle being arranged in the drawings for testing surfaces in vertical planes: Should the operator desire to test a certain spot on work in process, the clamping-bolt D is released by means of the nut $g$. This end of the needle is now free and ready to be swung in a vertical plane rapidly and approximately to the desired point, the needle now being centered or pivoted at the opposite end in the post E between the spring and adjusting-screw.

Having set the end $b$ of the needle approximately at the spot, the clamping-bolt is now secured fast to the standard. This renders the forward pivot fixed upon the standard; but owing to the construction of the bolt, which is cylindrical where the needle rests upon it, said needle is free to swing thereupon for an axis. Such action now occurs when the fine adjustment is made, which is effected by movement of the adjusting-screw $m$. The latter, since the needle is now centered upon the clamping-bolt as a pivot, has the advantage of the location some distance therefrom. Hence a very small movement is required to effect the desired fine adjustment.

One of the prominent features in my invention consists in providing the needle with two pivots, while the center of movement may be shifted from one end of the needle to the other, as either quick or fine adjustment is required.

What I desire to claim is—

1. A surface-gage consisting of a base, two supports thereon, and a needle slotted in part and upheld at two points by said supports, pivoting upon one for quick adjustment, upon the other for slow adjustment, substantially as herein described.

2. A surface-gage composed of a base and two supports—a slotted standard and post—and a bar or needle upheld at two points and adapted to swing upon either support as an axis in a vertical plane, substantially as and for purposes herein set forth.

3. In combination with a suitable base, a curved slotted standard, and the needle apertured in part pivoted thereto at one end, the hollow post with a transverse slot, in which the needle is upheld and capable of adjustment in a vertical plane, swinging upon the opposite end as a pivot, substantially as stated.

4. The reversible needle slotted in part, adjustable in a vertical plane, and having endwise movement, two pivots, one at each end, combined with a slotted standard and a clamping-bolt, a hollow post, with its adjusting screw and spring, and the base, all operating as herein specified.

5. A suitable base, a hollow post transversely apertured, with the co-operating spring and screw therein, a reversible needle-bar having endwise movement through said post and oscillating upon it for one adjustment, combined with a standard, its longitudinal slot, and the clamping-bolt engaging said needle, which swings upon said bolt for the other adjustment, substantially as herein stated.

In testimony whereof I affix my signature in presence of two witnesses.

WILLIAM H. H. NORCROSS.

Witnesses:
H. E. LODGE,
F. N. WALES.